United States Patent
Aboujaib et al.

(10) Patent No.: US 10,145,560 B2
(45) Date of Patent: Dec. 4, 2018

(54) VALVE WITH INTEGRATED ACTUATING DEVICE, NOTABLY FOR A COMBUSTION SYSTEM

(71) Applicant: GE ENERGY PRODUCTS FRANCE SNC, Belfort (FR)

(72) Inventors: Mohamad-Maher Aboujaib, Evette Salbert (FR); Ezio Pena, Cranvanche (FR)

(73) Assignee: GE Energy Products France SNC, Belfort (FR)

( * ) Notice: Subject to any disclaimer, the term of this patent is extended or adjusted under 35 U.S.C. 154(b) by 0 days.

(21) Appl. No.: 15/105,200

(22) PCT Filed: Dec. 17, 2014

(86) PCT No.: PCT/EP2014/078332
§ 371 (c)(1),
(2) Date: Jun. 16, 2016

(87) PCT Pub. No.: WO2015/091710
PCT Pub. Date: Jun. 25, 2015

(65) Prior Publication Data
US 2016/0341428 A1 Nov. 24, 2016

(30) Foreign Application Priority Data
Dec. 18, 2013 (FR) ...................... 13 62887

(51) Int. Cl.
*F16K 49/00* (2006.01)
*F23R 3/28* (2006.01)
(Continued)

(52) U.S. Cl.
CPC .............. *F23R 3/283* (2013.01); *F02C 7/232* (2013.01); *F16K 11/0873* (2013.01);
(Continued)

(58) Field of Classification Search
CPC ............ Y10T 137/6579; F16K 49/005; F16K 11/0876; F23R 3/283
See application file for complete search history.

(56) References Cited

U.S. PATENT DOCUMENTS 3,901,269 A * 8/1975 Henderson ............ F16K 49/005
137/340
3,916,941 A * 11/1975 Usry ...................... F16K 49/005
137/340
(Continued)

FOREIGN PATENT DOCUMENTS

DE 102007029064 A1 12/2008
FR 1261281 A 5/1961

OTHER PUBLICATIONS

PCT Search Report and Written Opinion issued in connection with corresponding Application No. PCT/EP2014/078332 dated Mar. 17, 2015.

*Primary Examiner* — Kevin Murphy
(74) *Attorney, Agent, or Firm* — Global Patent Operation; Robert D. Crawford, II

(57) ABSTRACT

The valve, notably for a combustion system, is comprised of a valve body, at least a first fluid inlet pipe, at least one outlet pipe for the fluid arranged on the valve body, a shutter mounted movably within the valve body and capable of ensuring fluid communication between the pipes, and an actuating device of the shutter mounted within the valve body and capable of being controlled electrically. The valve also contains a cooling circuit arranged within the valve body and surrounding at least part of the actuating device, at least one cooling fluid inlet pipe, and at least one outlet pipe for the fluid arranged on the valve body and in fluid communication with the cooling circuit.

20 Claims, 1 Drawing Sheet

(51) Int. Cl.
*F16K 11/087* (2006.01)
*F02C 7/232* (2006.01)
*F16K 31/04* (2006.01)

(52) U.S. Cl.
CPC .......... *F16K 31/041* (2013.01); *F16K 49/005* (2013.01); *F05D 2220/32* (2013.01); *Y10T 137/6579* (2015.04); *Y10T 137/86823* (2015.04); *Y10T 137/86863* (2015.04)

(56) References Cited

U.S. PATENT DOCUMENTS

| | | | | |
|---|---|---|---|---|
| 4,552,334 A | * | 11/1985 | Tomiyama | C21C 5/48 137/240 |
| 4,583,570 A | | 4/1986 | Rabe | |
| 5,357,999 A | * | 10/1994 | Loth | E21B 33/0355 137/236.1 |
| 5,706,851 A | | 1/1998 | Lopez-Gomez et al. | |
| 7,117,675 B2 | * | 10/2006 | Kaplan | F01D 25/12 239/132.1 |
| 7,874,310 B1 | * | 1/2011 | Jansen | F01D 25/12 137/340 |
| 8,104,258 B1 | * | 1/2012 | Jansen | F02C 7/232 137/240 |
| 8,281,863 B2 | * | 10/2012 | Voss | F16K 3/0254 166/332.4 |
| 2005/0009788 A1 | | 1/2005 | Lockwood et al. | |
| 2010/0133453 A1 | | 6/2010 | Hoppe et al. | |
| 2012/0313025 A1 | | 12/2012 | Takai et al. | |
| 2013/0199615 A1 | | 8/2013 | McHugh et al. | |

* cited by examiner

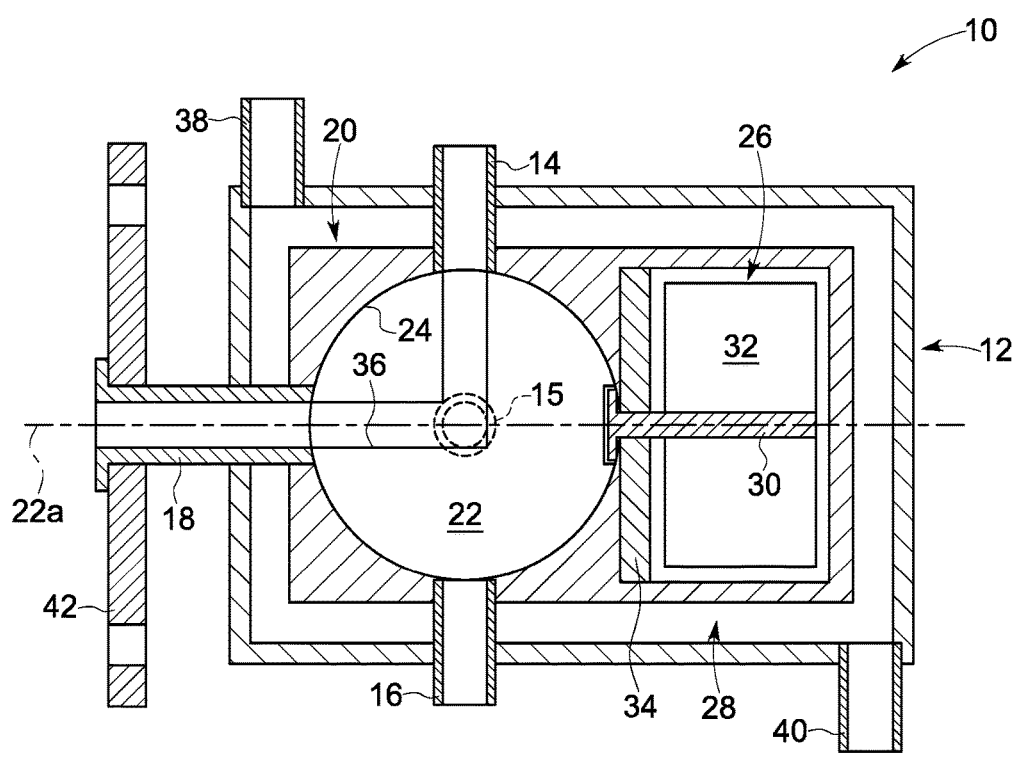

VALVE WITH INTEGRATED ACTUATING DEVICE, NOTABLY FOR A COMBUSTION SYSTEM

The present invention concerns the general field of valves, and more particularly valves used in the fuel supply systems of combustion systems such as gas turbines, boilers, burners, etc.

Industrial combustion systems burn a mixture of oxidizer such as oxygen, and fuel such as gas or liquid fuel. In the case of multi-fuel systems, these generally do not simultaneously use liquid fuel and gaseous fuel, but are supplied alternately with both fuels. The operation which consists of changing the supply fuel is conventionally designated by the term "change over". Following such a fuel change over, the supply system of one of the fuels is stopped.

During the stoppage of the liquid fuel, the stagnant liquid may be subject to solidification due to high temperature and in the presence of air.

In the case where the fuel is liquid fuel, this phenomenon is described by the term "coking"

Such solidification is indicated in particular by deterioration of the sensitive elements of the combustion system, of the sealing function of mechanical components such as valves and check valves, and by reduction of the fuel flow rate in the combustion system.

To remedy this drawback in the case of a gas turbine, it is known, for example, to discharge the residual liquid fuel in the combustion system by a first purging step through the admission of pressurized water, followed by a second purging step in which pressurized gas is admitted to discharge the water.

Valves are provided in the supply system to allow for the distribution of the liquid fuel, the purge air and the purge liquid. Conventionally, such valves each contain a multiplicity of inlet pipes mounted on the valve body for the fuel fluid, purge liquid and purge gas supplies, and an shutter mounted movably within the said body to ensure fluid communication between the different pipes. Each valve is generally associated with a pneumatic actuator to control the control the shutter. The pneumatic actuator is mounted adjacent to the associated valve and comprises a control stem extending across the inside of the valve body to be mechanically connected to the shutter.

Such a pneumatic actuator is generally used to the extent that this type of actuator is able to withstand high temperatures unlike an electrical actuator whose maximum operating temperature generally does not exceed 85° C. In fact, the associated valve is generally located in the vicinity of the combustion chamber(s) of the turbine, in zones where temperatures as high as 190° C. can be reached.

This solution has, however, a major drawback in that it requires the use of several compressed air supply pipes for each pneumatic actuator associated with a valve.

As a result, for the entire supply system of the turbine which comprises multiple valves, a large number of air supply pipes are present. Furthermore, this solution requires the use of an air compression system.

The present invention is aimed at remedying these drawbacks.

The invention concerns a valve, notably for a combustion system, comprised of a valve body, at least a first fluid inlet pipe and at least one outlet pipe for said fluid arranged on the valve body, an shutter mounted movably within the said valve body and capable of ensuring fluid communication between the said pipes, and an actuating device of the said shutter mounted within the valve body and capable of being controlled electrically. The valve also contains a cooling circuit arranged within the valve body and surrounding at least part of the actuating device, and at least one cooling fluid inlet pipe and at least one outlet pipe for said fluid arranged on the valve body and in fluid communication with the cooling circuit.

Thus, a valve with an actuating device fully integrated within the valve body is obtained. This simplifies the mounting of the valve on the associated fluid supply system and the structure of said system. In addition, the cooling circuit allows for cooling of the electrically controlled actuating device 10, which allows the valve to be used in high temperature zones, for example, in the vicinity of the combustion chamber(s) of a combustion system. Furthermore, the command response time is reduced.

In one design, the actuating device comprises a mechanical element connected to the shutter and an electrical control means of said element. The cooling circuit preferably surrounds at least part of the electrical control means. A partition wall can be placed between the shutter and the electrical control means.

The cooling circuit can be arranged at least partially around the shutter, i.e. surround at least part of the shutter. In a preferred design, the cooling circuit fully surrounds the shutter and the actuating device.

The valve preferably comprises an internal box mounted within the valve body and within which the shutter and the actuating device are housed. The cooling circuit can advantageously be formed between the internal box and the valve body.

In one design, the valve comprises first, second and third inlet pipes arranged on the valve body and designed to be supplied with fuel fluid, purge liquid and purge gas respectively.

The shutter may comprise a single circulation channel arranged on the said shutter to provide fluid communication between each of the inlet pipes and the outlet pipe in three different positions of the shutter.

The invention also concerns a supply system for a combustion system comprising at least one combustion chamber that can be fed with fuel fluid, the supply system comprising means of inlet of fuel fluid, means of inlet of purge liquid, means of inlet of purge gas, and a valve as previously defined, wherein the first, second and third inlet pipes of the valve are connected to the means of inlet of fuel fluid, means of inlet of purge liquid and means of inlet of purge gas.

The present invention will be better understood after reading the detailed description of a design used by way of example, which is by no means exhaustive, and illustrated by the attached figure which schematically shows a valve based on an example of the invention.

The figure represents a design example of a valve, referenced in its entirety as 10, designed to be used in a supply system for a combustion system comprised of one or more combustion chambers capable of being supplied with gas or with liquid fuel. The combustion system may be, for example, a turbine, a boiler, a burner, etc.

The valve 10 includes an external valve body 12, an inlet pipe 14 designed to be supplied with liquid fuel, a first purge pipe 16 designed to be supplied with purge gas, a second purge pipe 15 perpendicular to the pipes and designed to be supplied with purge liquid, an outlet pipe designed to be connected to the combustion chamber(s) of the associated combustion system, an internal box 20 mounted within the external valve body 12 and a spherical shutter 22 mounted movably within a housing 24 of complementary shape to the box. The second purge pipe 15 is located in a plane different from the plane containing the inlet pipe 14, the purge pipe 16 and the outlet pipe 18.

The inlet pipe 14, the two purge pipes 15,16 and the outlet pipe 18 are distinct and arranged on the valve body 12 in such a way that they extend across the inside of the latter and open into the housing 24 of the internal box. In the design example shown, the external body 12 and the internal box 20 have a generally rectangular shape. As a variant, other shapes, for example square or spherical shapes, can be used. In an embodiment, the box 12 and shutter 22 are made of metal, which promotes good sealing between these two elements.

The valve 10 also comprises an actuating device 26 of the shutter that is entirely mounted inside the valve body 12, and an associated cooling circuit 28 to allow the valve to be mounted in high temperature zones in the vicinity of the combustion chamber(s) of the system.

The actuating device 26 is mounted inside the internal box 20 and comprises a control stem 30 and an electrical control means 32 of said stem. The control stem 30 is mechanically connected at one of its ends to the shutter 32 so as to allow the latter to rotate with respect to the valve body 12 and the box 20. The stem 30 extends across a partition wall 34 mounted inside the box 20. When considering the axis of elongation of the stem 30, the partition wall 34 is axially interposed between the shutter 22 and the electrical control means 32. The partition wall 34 ensures the sealing between these two elements.

The electrical control means 32 allows the control stem 30 to be driven rotationally about its axis of elongation. The electrical control means 32 may be, for example, a brushless or direct current type electric motor mechanically connected to the control stem 30. Alternately, the electrical control means 32 may be an electric motor magnetically connected to the stem 30. The valve 10 also comprises electrical connection means (not shown) capable of electrically connecting the control means 32 to a source of electrical energy external to said valve.

Under the action of the electrical actuating device 26 receiving electrical energy, the shutter 22 is rotationally movable within the housing 24 of the internal box such as to selectively connect the outlet pipe 18 of the valve to the liquid fuel inlet pipe 14, or to the gas purge pipe 16, or to the liquid purge pipe 15. The shutter 22 is rotationally movable about an axis 22a coaxial with the axis of the stem 30. In the design example shown, the shutter 22 includes a single circulation channel 36 in order to allow, in a first position with respect to the internal box 20 and the body 12 as shown in the figure, fluid communication between the liquid fuel inlet pipe 14 and the outlet pipe 18. In this position, the valve 10 allows the combustion chamber(s) of the combustion system to be supplied with liquid fuel. Here, the circulation channel 36 is generally L-shaped and can be formed by on the shutter 22 by machining.

In a second position of the shutter 22, the circulation channel 36 ensures the connection of the liquid purge pipe to the outlet pipe 18. In this position, the valve 10 allows the purge liquid to enter the supply system of the combustion system in order to discharge the residual liquid fuel in said system. In a third position of the shutter 22, the circulation channel 36 ensures fluid communication between the purge pipe 16 and the outlet pipe 18. In this third position of the shutter 22, the valve 10 allows the purge gas to enter the liquid fuel supply system of the combustion system in order to allow the previously entered residual purge liquid to be discharged.

In the design example shown, the cooling circuit 28 is arranged on the inside of the valve body 12 to ensure the cooling of both the shutter 22 and the actuating device 26. The cooling circuit 28 is formed between the external body 12 and the internal box 20. The cooling circuit 28 forms a peripheral circuit fully surrounding the internal box 20, the shutter 22 and the actuating device 22. The cooling circuit 28 extends over the full length of the shutter 22 and the actuating device 26.

To ensure circulation of a cooling fluid within inside the circuit 28, the valve 10 also comprises an inlet pipe 38 and an outlet pipe 40 for said fluid mounted on the valve body and opening into the inside of said circuit. The pipes 38, 40 are located at the opposite ends of the valve body 12. The cooling fluid may, for example, be water or any other appropriate fluid.

The cooling circuit 30 allows for cooling of the inlet pipe 14 and shutter 22 in a manner such as to limit the risk of solidification of the liquid fuel inside these two elements. In addition, the circuit 28 ensures the cooling of the electric actuating device 26, which allows the valve 10 to be mounted in high temperature zones in the proximity of the combustion chamber(s) of the combustion system. To this end, the valve 10 also includes a mounting flange 42 across which the outlet pipe 18 extends.

In the design example shown, the shutter comprises a single circulation channel to ensure the connection between the outlet pipe and the different inlet pipes for fuel fluid and purge fluid. As a variant, it is possible to provide two distinct circulation channels, one for the circulation of fuel fluid and purge liquid and the other for the circulation of purge gas. Moreover, in the design example shown, the shutter has a generally spherical shape and is mounted rotationally movable. As a variant, the shutter may also take the form of a rotationally movable cylinder or cone, or a translationally movable cylinder or slider.

In the design example described, the cooling circuit is defined between the internal surface of the external body 5 of the valve and the internal surface of the internal box within which the shutter and the associated actuating device are housed. As a variant, it may be possible not to provide an internal box and to mount the shutter and the actuating device directly on the inside of the valve body. In this case, the cooling circuit can be formed in the thickness of the valve body.

In the design shown, the valve is intended to be used in the liquid fuel supply system of the combustion system. As a variant, it may also be possible to use the valve in the gas fuel supply system of the combustion system or still in another type of application that needs to be installed in a high temperature zone and requires the use of one or several different types of fluids.

The invention claimed is:
1. A valve comprising:
a valve body having an internal surface;
a first inlet and a second inlet in fluid communication with the valve body to provide a first and second fluid, respectively, to the valve;
an outlet in selective fluid communication with the first inlet and second inlet;
a shutter rotatably disposed within said valve body and having a fluid path to selectively provide fluid communication between one of the first and second inlets and the outlet;

an actuator disposed within the valve body and having a stem coupled to the shutter to selectively rotate the shutter, wherein the actuator and the shutter are spaced from the valve body; and a cooling circuit including a peripheral circuit arranged within the valve body, a cooling fluid inlet and a cooling fluid outlet, the cooling fluid inlet and cooling fluid outlet in fluid communication with the peripheral circuit;

wherein the peripheral circuit surrounds the shutter and the actuator providing a cooling fluid flow path, and is defined by the internal surface of the valve body, wherein the cooling fluid inlet is arranged to receive a cooling fluid provided to the peripheral circuit to cool the shutter and the actuator, and wherein the cooling fluid outlet is arranged to remove the cooling fluid from the peripheral circuit and valve body.

2. The valve according to claim 1, wherein the actuator selectively rotates the stem and the shutter in response to an electrical signal provided remotely.

3. The valve according to claim 1, wherein the peripheral circuit includes an enclosure disposed within the valve body, wherein the shutter and the actuator are disposed within the enclosure, and wherein an outer surface of the enclosure and the internal surface of the valve body define the cooling fluid flow path surrounding the shutter and the actuator and in fluid communication with the cooling fluid inlet and cooling fluid outlet.

4. The valve according to claim 3, further comprising a partition wall disposed between the shutter and the actuator, wherein the stem extends through an opening in partition wall to couple with the shutter.

5. The valve according to claim 3, wherein the peripheral circuit extends about the entire outer surface of the enclosure.

6. The valve according to claim 3, wherein the enclosure fully surrounds the shutter and the actuator.

7. The valve according claim 1, wherein the actuator includes a rotator coupled to the stem that selectively rotates the stem and shutter in response to an electrical signal.

8. The valve according claim 1, wherein the cooling fluid inlet is fluidly disposed at one end of and in fluid communication with the peripheral circuit, and the fluid cooling outlet is disposed fluidly at an opposing end of and in fluid communication with the peripheral circuit, wherein the actuator and shutter are disposed between the cooling fluid inlet and the cooling fluid outlet.

9. The valve according to claim 1, further comprising:
a third inlet in fluid communication with valve body to provide a third fluid to the valve;
wherein the outlet is in selective fluid communication with the first inlet, second inlet and third inlet; and
wherein the fluid path of the shutter selectively provides fluid communication between one of the first, second and third inlets and the outlet.

10. The valve according to claim 9, wherein the flow path of the shutter provides a respective first, second or third fluid between a respective first, second or third inlet and the outlet when the shutter is in one of three different positions.

11. The valve according to claim 9, wherein the first, second and third fluids are different fluids.

12. The valve according to claim 9, wherein the first fluid is a fuel fluid, the second fluid is a purge liquid and third fluid is a purge gas.

13. The valve according to claim 1, wherein the first fluid is a fuel fluid and the second fluid is a purge fluid.

14. The valve according to claim 1, wherein the shutter is spherical.

15. The valve according to claim 1, wherein the peripheral circuit fully surrounds the shutter and the actuator.

16. The valve according to claim 1, wherein the shutter and the actuator, and the internal surface of the valve body define a cooling fluid flow path surrounding the shutter and the actuator and in fluid communication with the cooling fluid inlet and cooling fluid outlet.

17. A valve comprising:
a valve body;
a first inlet, a second inlet and a third inlet in fluid communication with the valve body to provide a first, second and third fluid, respectively, to the valve;
an outlet in selective fluid communication with the first inlet, second inlet and third inlet;
a shutter rotatably disposed within said valve body and having a fluid path to selectively provide fluid communication between one of the first, second and third inlets and the outlet;
an actuator disposed with the valve body and having a stem coupled to the shutter to rotate the shutter to selectively align the fluid path of the shutter with one of the first, second or third inlet;
an enclosure having an outer surface and disposed within and spaced from the valve body, wherein the shutter and actuator are disposed in the enclosure;
a cooling circuit including a peripheral circuit arranged within the valve body, a cooling fluid inlet and a cooling fluid outlet, the cooling fluid inlet and cooling fluid outlet in fluid communication with the peripheral circuit;
wherein the peripheral circuit surrounds the enclosure and is defined by an internal surface of the valve body and the outer surface of the enclosure defining a cooling fluid flow path surrounding the enclosure and in fluid communication with the cooling fluid inlet and cooling fluid outlet,
wherein the cooling fluid inlet is arranged to receive a cooling fluid provided to the peripheral circuit to cool the shutter and the actuator arranged in the enclosure, and
wherein the cooling fluid outlet is arranged to remove the cooling fluid from the peripheral circuit and valve body.

18. The valve according to claim 17, wherein the first fluid is a fuel fluid, the second fluid is a purge liquid and third fluid is a purge gas.

19. The valve according to claim 17, further comprising a partition wall disposed between the shutter and the actuator within the enclosure wherein the stem extends through an opening in partition wall to couple with the shutter to provide a seal therebetween.

20. The valve according to claim 17, wherein the actuator includes a motor to selectively rotate the stem and the shutter a predetermined distance.

* * * * *